(12) United States Patent
Parkinson

(10) Patent No.: US 8,297,119 B2
(45) Date of Patent: Oct. 30, 2012

(54) LIQUID LEVEL MONITORING APPARATUS AND METHODS

(75) Inventor: Craig Stephen Parkinson, Runnaway Bay (AU)

(73) Assignee: Multitrode Pty Ltd (AU)

( * ) Notice: Subject to any disclaimer, the term of this patent is extended or adjusted under 35 U.S.C. 154(b) by 681 days.

(21) Appl. No.: 11/922,184

(22) PCT Filed: Jun. 16, 2006

(86) PCT No.: PCT/AU2006/000844
§ 371 (c)(1),
(2), (4) Date: Dec. 12, 2007

(87) PCT Pub. No.: WO2006/133511
PCT Pub. Date: Dec. 21, 2006

(65) Prior Publication Data
US 2010/0162812 A1    Jul. 1, 2010

(30) Foreign Application Priority Data
Jun. 16, 2005    (AU) .................................. 2005903144

(51) Int. Cl.
*G01F 23/00* (2006.01)
(52) U.S. Cl. ......................................................... 73/299
(58) Field of Classification Search ................ 73/299; 324/800
See application file for complete search history.

(56) References Cited

U.S. PATENT DOCUMENTS

| | | | |
|---|---|---|---|
| 2,674,881 A * | 4/1954 | Rich ................................ | 73/300 |
| 4,231,025 A * | 10/1980 | Turner, Jr. ...................... | 340/521 |
| 4,739,186 A | 4/1988 | Crookshanks | |
| 4,739,786 A | 4/1988 | Parkinson | |
| 5,553,794 A | 9/1996 | Oliver et al. | |
| 5,860,790 A | 1/1999 | Wang | |
| 5,901,603 A | 5/1999 | Fiedler | |
| 5,942,980 A | 8/1999 | Hoben | |
| 6,761,067 B1 | 7/2004 | Capano | |
| 6,928,862 B1 * | 8/2005 | Robbins ....................... | 73/64.55 |
| 7,798,373 B1 * | 9/2010 | Wroblewski et al. ........... | 222/64 |
| 2003/0033871 A1 | 2/2003 | Carroll et al. | |
| 2005/0280424 A1 | 12/2005 | Qu et al. | |

FOREIGN PATENT DOCUMENTS

| | | |
|---|---|---|
| DE | 20122611 U1 * | 10/2006 |
| EP | 0 382 491 A1 | 8/1990 |
| EP | 1 582 848 A1 | 10/2005 |
| JP | 8 014983 A | 1/1996 |
| JP | 09-166471 | 6/1997 |
| WO | WO 86/02725 A1 | 5/1986 |

OTHER PUBLICATIONS

Supplementary European Search Report for EP06741250 dated Apr. 27, 2012.

* cited by examiner

*Primary Examiner* — Peter Macchiarolo
*Assistant Examiner* — Alex Devito
(74) *Attorney, Agent, or Firm* — Gilman Clark & Hunter LLC

(57) ABSTRACT

The present invention relates to a liquid sensor for locating in a liquid. The liquid sensor includes a level sensor including one or more sensing stations located between a head and a tail of the liquid sensor. The liquid sensor is suitable for sensing the liquid level. The liquid sensor further includes a depth sensor for sensing the depth of the tail in the liquid. The liquid sensor is particularly suited to pumping station applications.

19 Claims, 13 Drawing Sheets

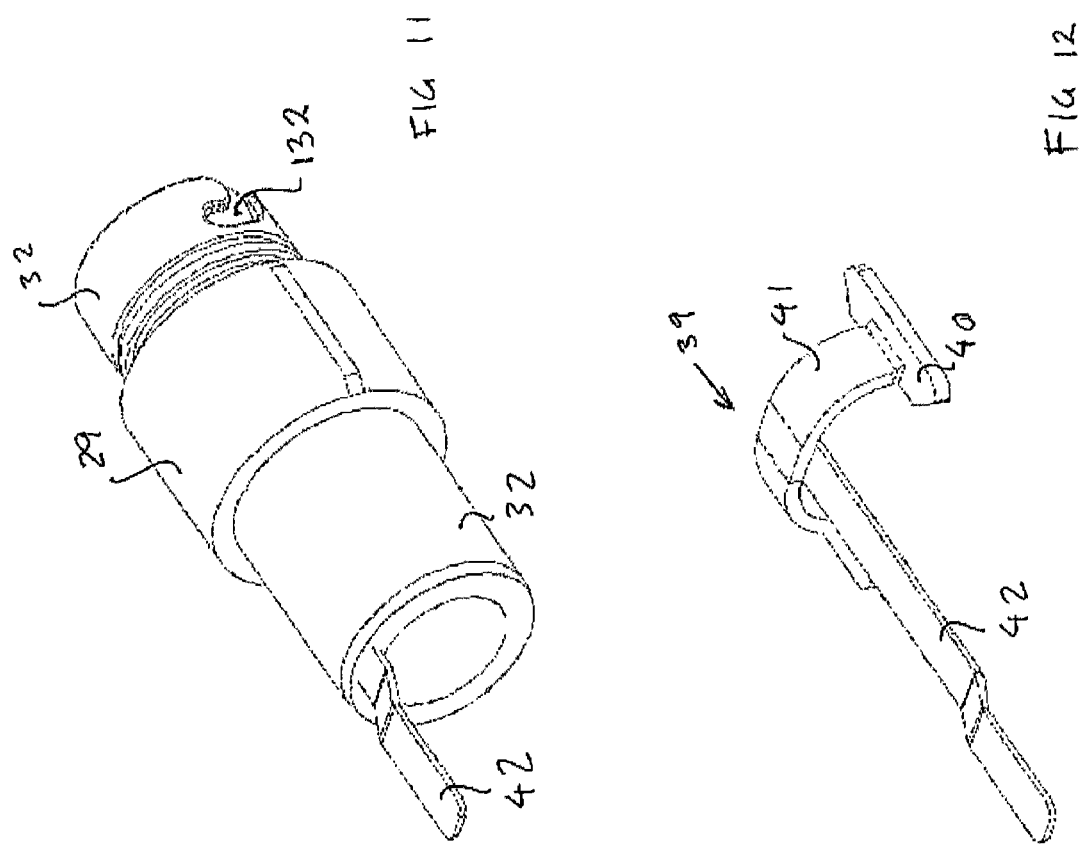

LIQUID LEVEL MONITORING APPARATUS AND METHODS

TECHNICAL FIELD

This invention relates to a waste water sensor.

This invention has particular but not exclusive application to liquid level monitoring apparatus and methods for water and waste water management, and for illustrative purposes reference will be made to such application. However, it is to be understood that this invention could be used in other applications, such as aqueous and non-aqueous liquid level monitoring apparatus and methods generally.

BACKGROUND TO THE INVENTION

The reference to any prior art in this specification is not, and should not be taken as an acknowledgement or any form of suggestion that the prior art forms part of the common general knowledge.

U.S. Pat. No. 4,739,786 and its related publications derived from WO86/02725 describe a monitoring assembly which has a plurality of sensors arranged in spaced relationship along a body which may be suspended from a coded multi-core cable in a reservoir to monitor liquid levels therein. Each sensor is connected to a respective coded core of the multi-core cable such that any sensor may be selectively coupled to a remote control apparatus. The output may be used to operate level alarms, pumps or the like.

An inherent difficulty which occurs with liquid level sensors in practical applications such as waste water management lies in the inhomogeneous nature of the medium in which they operate. Entrained fats and oils, and solids such as precipitated salts and grit, provide that the sensors may be encapsulated or otherwise rendered inoperable. Multiple sensor elements may be adapted to provide some diagnostic functions whereby occlusion of a sensor relative to one or more other sensors may be logically interpreted as indicative of a need for maintenance such as cleaning.

The monitoring apparatus provides reliable sensing at each sensor station along the body, but is not a continuous analogue level output device by virtue of the sensors being spaced along the body. Accordingly, any liquid level change between each pair of adjacent sensors cannot be detected or monitored. The liquid level above the topmost sensor and below the bottommost sensor is also not detected or monitored by the device, which also means that a power-down state of the sensors per se may go undetected. There remains a need for sensors to be more indicative of the need for maintenance and for apparatus to provide continuous analogue or digital output.

There have been attempts to use a pressure sensor, bubbler or other analogue device in a pit with a probe as described above. This approach has been unsuccessful due to the difficulty in reliably installing a pressure sensor low enough in a sewerage well to be effective. Although the probe operates well at a low liquid cut off level, the pressure transducers are unreliable at this low liquid level. Turbulence is extreme at the last stages of pump out which effects liquid density so that presently available pressure sensors cannot be used at this low level. The pressure sensor obviously cannot be used at the lower (pump cut-off) level since the signal disappears into noise as the head pressure approaches zero. One approach to overcoming this problem that has been taken in the past is to mount the sensor higher than optimum. However, complete pump out of the well cannot be achieved accurately due to the inability to accurately calibrate the sensor in the highly variable environment. A higher cut off level does not evacuate the pit of liquid effectively, thereby resulting in excessive fat and debris build up due to it floating and concentrating in the top layer of liquid.

Arbitration techniques including a redundant low-level cutout sensor installed independently are known, and can result in pumps not being turned off at the appropriate time resulting in pump damage.

When installing two level sensor devices in the same pit, it is desirable to have a fixed physical unchangeable relationship between the two devices so that arbitration can be carried out in order to detect incorrect level measurement from either of the devices. To do this, the analogue sensor has to be a set distance below the bottom sensor on the probe and also, the controller needs also to know the distance between all other sensors accurately so it can calculate and compare continuously level height from each device. There can be many models and lengths of sensing probes that can be connected to a controller. In addition, an installation may have hundreds of sites so variables including sensing distances of analogue probe sensors, different models and lengths of probes, and changeable set points for pump starts/stops make the option to install independent systems unviable.

It is very difficult to physically to reliably install a separate pressure transducer at a consistent fixed distance say 60 mm lower than the bottom sensor of the probe. Since the pump cut-out point may be over 10 meters from the pit opening, workplace health and safety considerations will typically prohibit people climbing into a pit, especially at that depth, to ensure both the probe and the pressure transducer are at the right levels. In any case, both the probe and sensor need to be removed for cleaning on a regular basis so there will be a difference in levels due to reinstallation and also stretching of the sensor's cable or movement due to turbulence affects the position of the pressure transducer. Also, when the pump station is reaching the low pump out level, turbulence and water action can be extreme, so a separate pressure sensor unit will be violently washed around and damaged by the turbulence. Currently, pressure transducers are mounted much higher than the optimum level to try to overcome problems and damage due to turbulence but, even so, many transducers are still damaged from turbulence and extreme water flows found in sewerage pumping stations.

Fixing a separate pressure sensor to or near the probe, seriously affects the operation and reliability of the probe as excessive build up gets trapped between the sensor cable and probe.

The duty point on the probe is a problem because this is where build up occurs which may eventually cause the probe to fail. This is the zone where a pressure transducer may be favored, with sufficient depth to provide a pressure head and a useful signal to noise ratio. However, the previously described calibration problem remains. This duty area is very important when calculating volume pumped as a variation of the start point due to fat build-up compounds errors in calculating volume pumped. That is, if the pump is activated before the liquid level falls to that of the sensor then the controller logic will determine that the volume increased dramatically at the last stage during fill up mode and will use this inflated figure to calculate pump down volume.

Because high level alarms are rare, probe sensors and connections are not confirmed regularly. This area is critical from an environmental protection agency (EPA) perspective. Currently, once level is beyond the top of the probe, no more monitoring is available.

Currently, deploying dual back up systems of any kind is problematic. Dual back up systems are very difficult to commission and are subject to continual operational changes, which result in unreliability, false trips and system failure, mainly due to arbitration to which is the correct reading. During arbitration in systems including two independent level sensors, it is difficult to determine which sensor reading is correct in the event that there is a discrepancy between sensor readings. Set points for pump starts, stops, alarms are changed regularly by operators and calibration of the sensors is required when the set points are changed. Currently, skilled installers are required to physically install two level sensing devices accurately. Technical personnel then have to set up complex control and monitoring systems with arbitration and then hope that nothing moves due to cleaning, maintenance procedures or configuration changes, otherwise the commissioning and set up has to all be repeated.

It is an object of the present invention to address one or more of the foregoing problems.

SUMMARY OF THE INVENTION

According to a first aspect of the present invention, there is provided a liquid sensor to be located in a liquid, the liquid sensor including:
  an elongate body defining a head and a tail;
  a level sensor including one or more sensing stations supported by the body between the head and the tail and for sensing the liquid level, each sensing station including one or more electrodes for contacting the liquid and through which electricity can enter or leave the liquid; and
  a depth sensor supported by the body and for sensing the depth of the tail in the liquid.

The depth sensor may include an integral pressure transducer which is located at a fixed distance from the bottom of the liquid sensor. The liquid sensor may be elongate and narrow.

The sensing stations may be linearly spaced apart. Each sensing station may include a single conductor or a pair of conductors (fail safe) for coupling to a control means.

Preferably, the depth sensor includes pressure sensing means. The pressure sensing means may be wholly located at the tail whereby a reference tube is not required. The pressure sensing means may be removable or fixed with respect to the liquid sensor.

The liquid sensor may further include a vibrator for vibrating deposited residue from the liquid sensor.

The head may include a conical or frusto-conical portion which impedes the buildup of debris.

This invention in another aspect resides broadly in to a liquid level monitoring apparatus including:
  an elongate body formed of an electrically insulating material, said elongate body having an interior and a wall;
  a plurality of sensor assemblies supported by said elongate body, said sensor assemblies being spaced along said elongate body at respective sensing stations, each said sensor assembly having
    a first portion extending axially along said interior of said elongate body and
    a second portion extending radially outwardly from said first portion, said second portion having at least one part extending through said wall of said elongate body to provide at least one exposed portion which is exposed to liquid outside said elongate body, said exposed portion being exposed around a minor portion of the transverse perimeter of said elongate body at its respective sensing station and along said body for a minor proportion of the spacing between respective said sensor assemblies;
  a plurality of electrical leads associated with said sensor assemblies and extending from said body for electrically signalling discrete liquid levels to control means; and
  pressure sensing means supported by said body and responsive to the hydrostatic pressure extant in the region of the lower end of said body, for electrically signalling continuous hydrostatic pressure levels to said control means.

The pressure sensing means may comprise one or more pressure transducers located in the region of the lower end of the elongate body and communicating with the control means.

Alternatively the pressure sensing means may comprise a gas pressure sensing device in fluid communication with a gas space within the elongate body, the gas space communication with the liquid in the reservoir by means of one of more openings in the region of the lower end of the elongate body, the gas space being supplied with gas such that the gas bubbles out of the one or more apertures.

By this means the gas space is maintained substantially isobaric with the hydrostatic pressure at the lower end of the elongate body.

An available pressure transducer intended for other purposes includes a solid state transducer portion having an atmospheric reference tube led out to a remote point and used to determine the atmospheric reference for calibrating the signal against variations in atmospheric pressure.

In the present invention, the pressure transducer may be used with its reference tube occluded to prevent destruction by ingress of liquid, the signal being processed by a control means that includes an independent atmospheric reference.

The sensor assemblies may be regularly spaced along the elongate body, or may be spaced according to a formula reflecting the critical levels of the reservoir in which the monitoring apparatus is used.

Each of the sensor assemblies may be of elongate form and extend with its longitudinal sides substantially parallel to the longitudinal axis of the elongate body.

Alternatively, the sensor assemblies may be button or bar like.

The sensor assemblies may include a pair of electrodes exposed at respective opposite sides of the elongate body.

The electrodes may be at a common potential relative to ground or other reference, connected by a bridge portion which is conductive and renders the two electrodes electrically isopotent.

Alternatively, each of the pair may comprise a separate circuit element.

The electrodes may extend outwardly beyond the surface of the elongate body.

The plurality of electrical leads may be constituted by a multicore cable in which each core is visibly identified and connects to a respective sensor assembly.

The multicore cable may be environmentally sealed as a sheathed bundle and led out of the environment for termination at the control means. The plurality of electrical leads may be multiplicated in that two or more sheathed bundles (or cables) may be led out, with the remote termination including means to monitor for equal potential between corresponding conductors. By this means, the destruction of one sheathed bundle, or at least a conductor within the bundle, may be detected.

Cable damage through accident and particularly through the action of vermin such as rats is a common cause of failure.

Early identification of such damage allows for preventative maintenance to be undertaken before monitoring apparatus failure.

The arrangement of a plurality of sensor terminals for determining the presence or absence of the liquid medium electrically and pressure sensing in the same physical device means that the device may be cross checked for integrity by the control means. The device may be precalibrated in order that the devices may be changed in and out of an installation without appreciable need for calibration post installation.

The control means in turn may be preconfigured to accept one or devices differentiated by length, such as by way of a selector switch or menu selection. The control means may be configured to operate pump cycles, alarms and process controls.

The control means may also provide for diagnostic outputs determined by monitoring the relative conditions of each of the sensors, between the sensors and between the sensors and the pressure sensing means.

There may be provided a piezo or electromechanical vibrator means that may be tuned to the length of the probe/pressure sensor, such that build-up can be shaken from the probe at regular intervals. Activation may be when probe is dry as well as immersed to achieve best results. The controller may also measure changes in impedance of each sensor to activate a cleaning process.

More than one frequency may be used. Vibrator may be activated immediately on sensing of discrepancies between probe and pressure sensor readings. This combined with the two methods of analogue and probe level detection working in harmony, will, under the present and increasing strict EPA regulations, provide municipalities and industry a real solution to a real and increasing problem.

The controller may include multiple level inputs. For example the controller may have input for connection of a 10-sensor probe with integrated analogue (e.g. pressure transducer) device. The controller may monitor 2 probes including integrated analogue devices in 2 wells for multi-well applications. The controller may monitor 2 analogue level devices (redundant mode). The redundant fail safe high alarm dual wiring sensor configuration may be available for all configurations.

The controller may be configurable for multiple modes of operation. For example, there may be a charge mode with preset factory defaults (for filling water tanks) and a discharge mode with preset factory defaults (for emptying tanks, sewerage pits). The outputs may be preset for several pumps and alarms plus expandable and configurable outputs for other control functions.

The controller may be a medium voltage controller, such as a controller and monitor of three phase supply and pump voltage and current inputs for all pumps.

The controller may have digital and analogue inputs with selectable set points, designated fault inputs, pulsed high speed inputs and accumulators. The controller may include motor protection for all pumps by monitoring under and over current, phase fail, earth fault, electronic motor protection and motor insulation resistance protection.

The controller may include station protection functions such as over and under voltage.

Measurement and reporting functions may include 3 phase station voltage, 3 phase voltage for all pumps, 3 phase pump currents, insulation resistance value for pumps, kilowatt hour, VA, VAhr, KW, in each tariff period, and battery DC backup.

The controller will calculate station inflow and outflow, individual pump rates, volumes and efficiency, time to spillage, spillage volume, time and duration of spill. Both analogue and probe inputs will be continually monitored so as to provide more accurate volumetric information.

The functionality of the controller may include full status via intuitive LCD display, full manual control and programming capability via display, data logging for all points based on change of state of digital, dead banding for analogue, and date and time stamping.

The controller programming capability may include the ability to select a variety of preset and configurable control algorithms to optimise station performance and reliability.

For example it may use IEC61131-3 language to produce custom controls and/or use IEC61131-3 language in conjunction with embedded logic to provide unique function capability.

The controller may utilize a range of communications including open communications such as DNP3 and Modbus via digital radio, wireless LAN, phone line, GPRS or CDMA networks.

Complex profiles consisting of pump and alarm set points, number of pumps allowed to operate, inputs and output configurations and other conditions can be set-up, stored and recalled as required. Profiles can be activated on certain fault or operation conditions, time of day, date of conditions in other pump stations.

Level input set-ups may be preconfigured. For example, a 10 sensor probe with integrated analogue transducer may enable special control and decisions to be made by the controller. Simple selection of each probe model at start up may enable auto configuration by the controller of the exact relationship of the analogue input and sensors. The controller may apply algorithms based on the level zone to take into account both weaknesses and strengths of both methods.

The controller may continually monitor and store input relationships so as to ensure the appropriate input is used when making level decisions. The controller may use several inputs and methods such as comparing resistance of several sensors which will change as fat builds up and covers the sensors at the first pump start point, simultaneously checking analogue reading to confirm decision.

The controller may also use the analogue input to confirm faster or slower than normal level changes which can be attributed to tracking over a fatty probe. The controller may activate a vibrator in the probe should a variation occur in the two inputs and also on a regular basis based on history and time for fat build-up or at certain resistance measurements for sensors. If the analogue input is suspect, the controller may use sensor information including level and resistance before sounding level alarms.

The controller may preference the bottom probe sensor to ensure pumps are turned off in the area where analogue is unreliable due to low heads, turbulence and liquid density variations due to suspended air etc. The use of a controller as above will use the best of both systems over each zone to continually calculate inflow, volume pumped, pump and station flow rates, time to overflow much more accurately and consistently than previously.

The controller may use the analogue input once level rises above the probe but will monitor the last 2 to 3 sensors on the probe to confirm analogue input. If analogue input is suspect, controller may use other temporary methods to calculate inflow and volumes by utilizing last known pump rates and time so as not to corrupt previously good data.

Currently, most operators use the visual method of selecting the appropriate sensor for pump starts, stops, low and high alarms. This is due to the fact that analogue settings not user friendly. For instance, the second pump start point may need to be just below the inflow in the pit which may be several meters from the top opening. To set an analogue setpoint at this point will require the operator to wait (for a long time) for the station to fill up to this point as to measure from the bottom up and convert to a 4-20 mA point is difficult. The operator will now be able to easily see the sensors on the probe and can select level set points accordingly. This will also set the "invisible" analogue set point simultaneously.

With the proposed probe and controller combinations, the task of setting up levels will be extremely simple. Previously with 2 independent systems it has been basically impractical to initially set up and configure, let alone to change level set-points later.

The controller may coordinate level setting carefully by prompting operators to firstly select levels based on the sensor increments. An analogue reading will be also 15 displayed. If a level setting is required that is in-between the probe sensors, the controller will accommodate and will then use alternate algorithms to cater for this.

BRIEF DESCRIPTION OF THE DRAWINGS

In order that this invention may be more readily understood and put into practical effect, reference will now be made to the accompanying drawings which illustrate a preferred embodiment of the invention and wherein:

FIGS. 11 and 12 illustrate the sensing component of the monitoring assembly illustrated in FIG. 10;

DESCRIPTION OF THE PREFERRED EMBODIMENT

Figure 1:
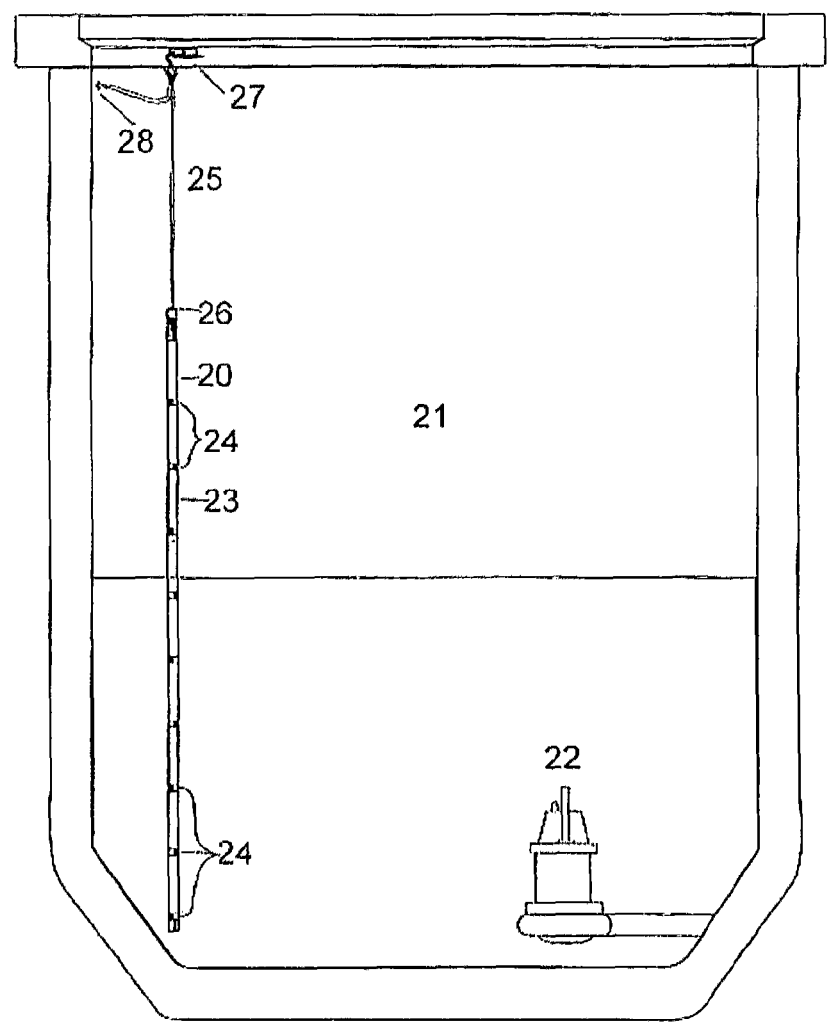
FIG. 1 is a diagrammatic illustration of a typical installation utilizing a liquid level monitoring assembly made in accordance with the present invention.

Referring to FIG. 1 it will be seen that the monitoring assembly 20 may be installed in a sewage pit 21 in which a submersible pump assembly 22 is installed for maintaining the sewage at a desired level. For this purpose the monitoring assembly 20 includes an elongate body 23 formed of plastics material and supporting a plurality of sensors 24 in 10 vertically spaced apart relationship such that the sensors 24 are electrically isolated from one another.

In the monitoring assembly 20 in the illustrated embodiments there are provided ten sensors 24. The sensor spacing can be equidistant or spaced at variable lengths. The body 23 may have a diameter of 30 millimeters but of course these dimensions can be varied as desired. Each sensor means 24 is dual-connected to a respective lead of a pair of multi-core cables 25 which are secured sealably to the top end 26 of the monitoring assembly. The cables 25 are supported by an upper mounting 27 adjacent the entrance to the pit 21 and from which the monitoring assembly 20 is suspended. The tail portions 28 of the cables 25 are directed to suitable above ground control apparatus (not shown) for controlling operation of the pump assembly 22. The control apparatus monitors the respective cables 25 to ensure that the cables are integral by comparison between the cables 25. A pressure transducer 50 is located at the tail of the monitoring assembly 20 for sensing the depth that the tail is immersed in the liquid.

Figure 2:
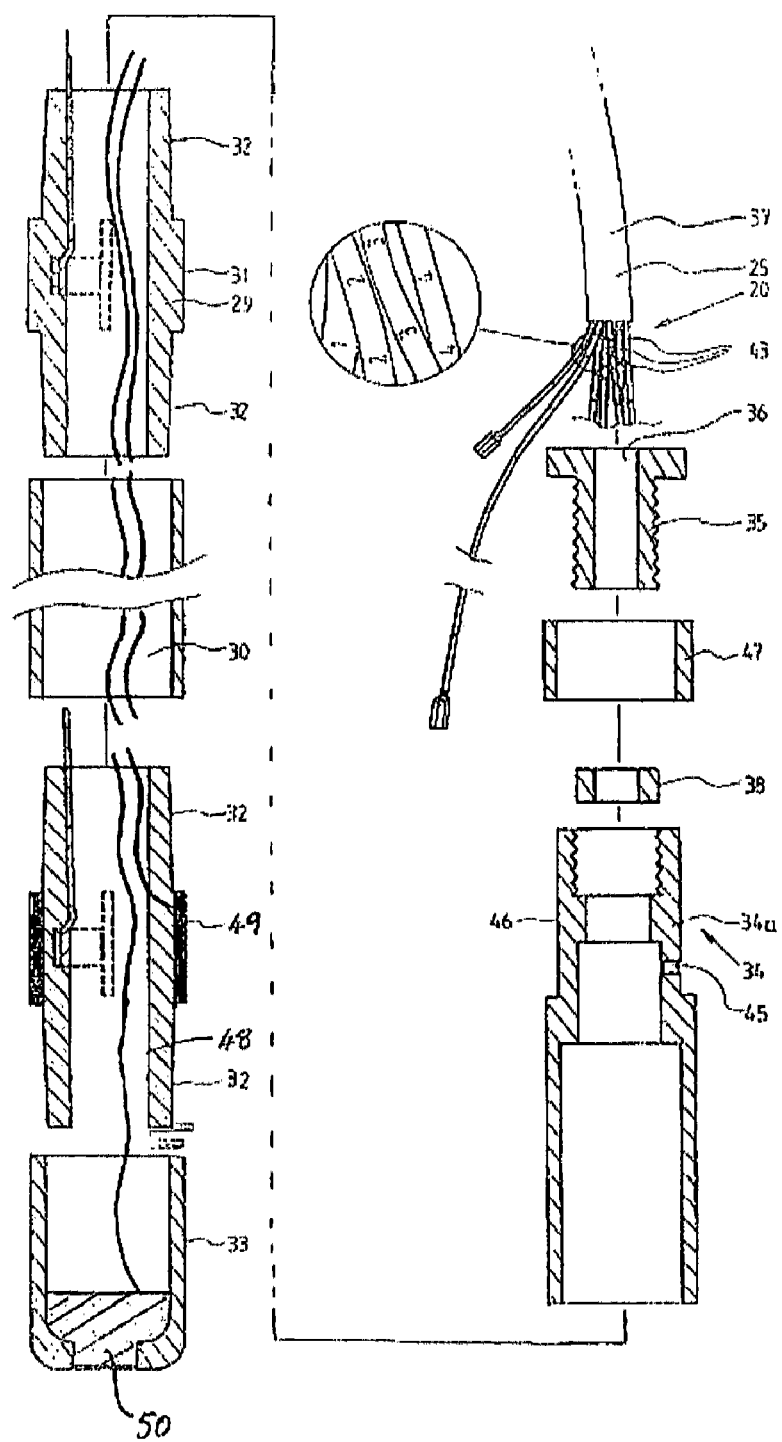
FIG. 2 is an exploded view of the monitoring assembly illustrated in FIG. 1.
Figure 3:
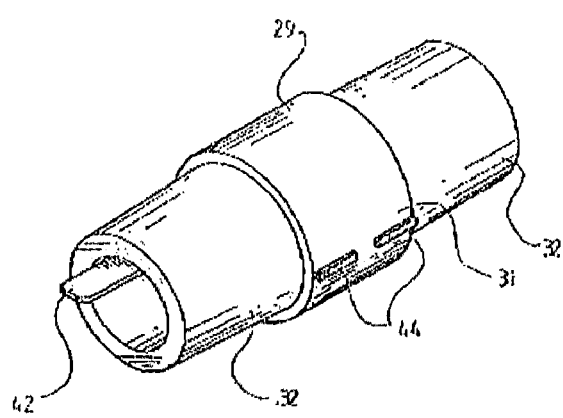
FIGS. 3 and 4 illustrate the sensing component of the monitoring assembly illustrated in FIG. 2.
Figure 4:
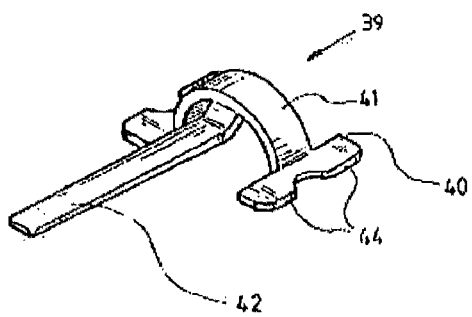

As can be seen in FIGS. 2 to 4 the monitoring assembly 20 is fabricated from a plurality of tubular components which plug into one another to form the elongate body 23. These tubular components include ten similar sensing sections 29 interconnected by respective spacer sections 30. There can be any number of sensors. Each sensing section 29 includes a central hub portion 31 and opposed reduced diameter tapered spigot portions 32 which plug into the spacer sections 30. The lowermost sensing section 48 is provided with a piezo vibrator 49. A bottom cap 33 incorporating a pressure transducer is provided to close the lower end of the body 23 and the upper end is closed by a gland assembly 34 which fits onto the spigotted upper end 32 of the uppermost sensing section 29. As illustrated the gland assembly 34 includes an internally threaded body portion 34a adapted to receive an externally threaded nut 35 having a bore 36 therethrough which has a diameter substantially equal to the diameter of the cable sheath 37. A rubber washer 38 is adapted to be interposed between the lower end of the nut 35 and the body portion 34a whereby it may clamp sealably about the sheath 37 when the nut 35 is screwed tightly into the body 34a.

Each sensing section 29 supports a stainless steel electrode assembly 39, as illustrated in FIG. 4, which comprises a pair of opposed sensors 40 interconnected by a bridge or arched portion 41 provided with a stepped bayonet connector 42 which is adapted to extend into the bore of the sensing section 29 and outwardly beyond the upper spigot portion 32. This bayonet connector is adapted for connection to a respective numbered lead 43 of the multicore cable 25. The bridge portion 41 is encased within the hub portion 31 and the spaced outermost portions 44 of each sensor 40 protrude beyond the outer surface of the outer hub portion 31 to provide the sensor means 24. The exposed ends of these portions 44 are chamfered to inhibit retention of foreign matter. This arrangement provides four discrete exposed sensing elements which will be effective in operation and which may be located in suitable locating means in injecting moulding apparatus so as to secure the electrode assembly in place during injection moulding operations.

Figure 5:
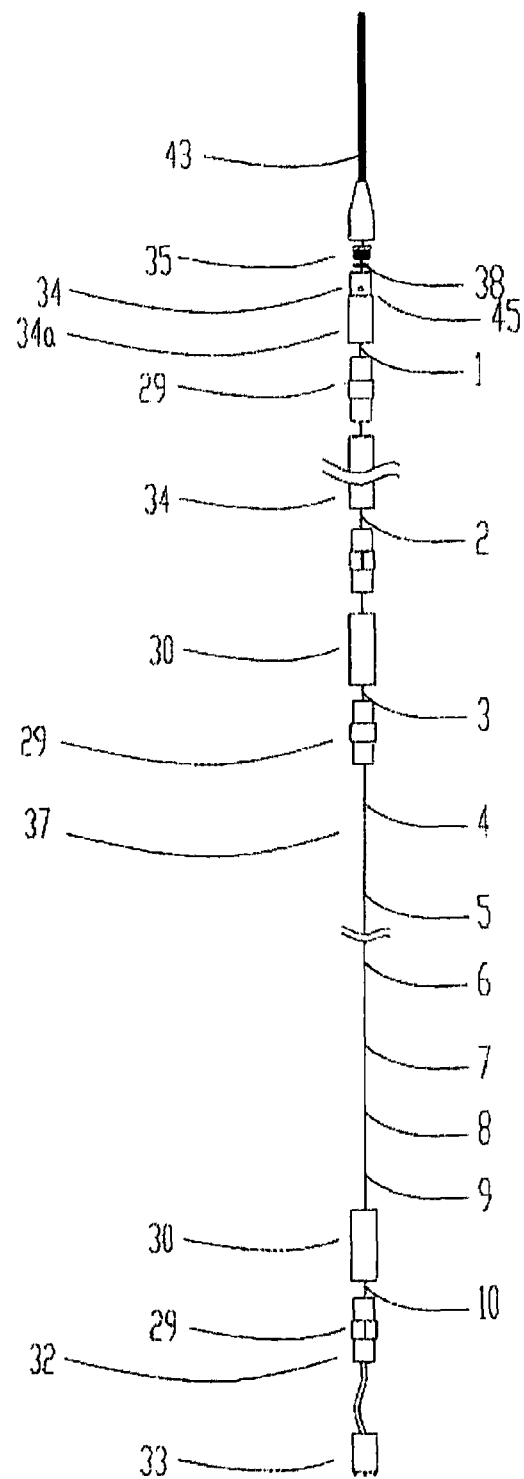
FIG. 5 is a further exploded view illustrating the method of assembling of the monitoring apparatus illustrated in FIG. 2.
Figure 6:
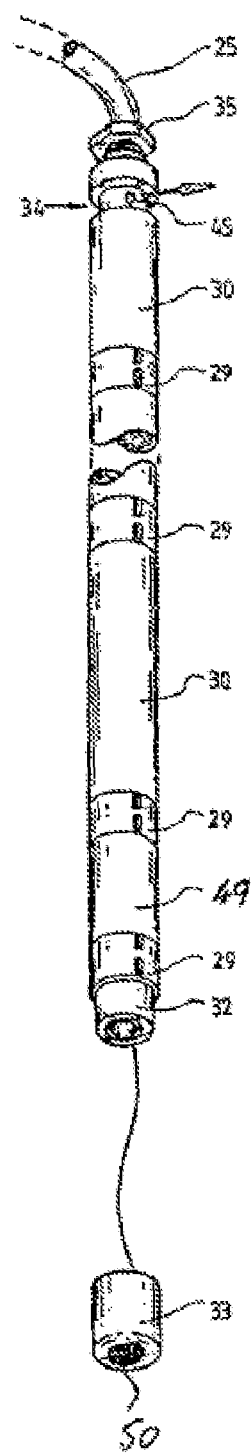
FIG. 6 illustrates a final step in the method of assembling the monitoring apparatus of FIG. 5.

The monitoring assembly 20 is fabricated as shown in FIGS. 5 and 6, by sliding all the body components along the cable 25 and removing the sheath 37 from the end portion of the cable so that the leads 43 are exposed. These are cut to length with the longest lead, No. 12 extending from the gland assembly 34 to the lowermost sensing section 29. These exposed leads 43 are then progressively cutaway to mate with the sensing sections 29 along the body 23. The longest lead No. 12 is then connected to the bayonet connection 42 of the lower sensing section 48 and the first spacer section 30 is moved downwardly across the 5 exposed leads 43 to engage about the upper spigot end 32. The next sensing section 29 is also moved down across the exposed leads 43 to engage within the upper end of the spacer section 30 and the next longest lead is connected to this sensing section. This operation continues until the shortest lead No. 1 is connected to the uppermost sensing section 29 whereupon the body portion 34a of the gland assembly 34 is engaged about the uppermost sensing section 29. The nut 35 is tightened to clamp the washer 38 about the sheath 37 to ensure a leakproof joint is formed between the sheath and the upper end of the body 23. A cone top will be installed to prevent the buildup of rags and paper on the top of the probe about the location where the cable enters the probe assembly. Preferably the joints between the tubular body components are fixed with a suitable adhesive. The leads are numbered from the top so that a lower portion of the assembly 20 may be cut off without changing the numbering sequence.

It will be seen that body portion 34a is provided with an outlet aperture 45 adjacent the lower end of a reduced diameter stem portion 46. A cone collar 47, the axial length of which is less than that of the stem portion, may be moved to a covering position about the outlet aperture 45, which aperture provides a vent for flooding with an encapsulant.

Figure 7:
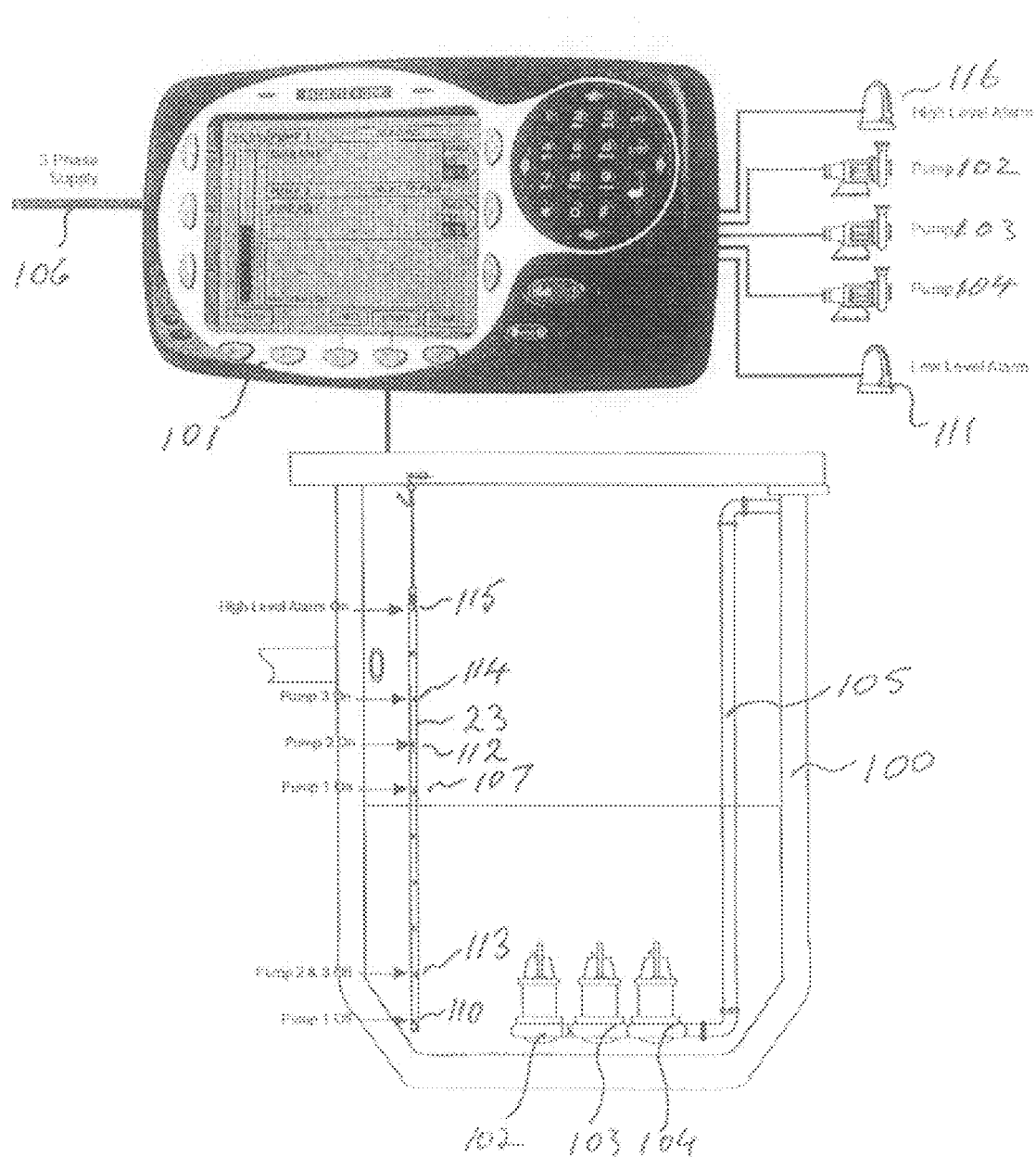
FIG. 7 is a typical layout diagram for a pumping station illustrating the connection of the monitoring assembly to control means for a pump.

In FIG. 7 there is illustrated a system where a tank 100 is equipped with a monitoring probe 23 connected to a control unit 101. The tank 100 has a first pump 102, a second pump 103 and a third pump 104 discharging through an outlet 105. The pumps are powered by means of the control unit 101 switching a three phase supply 106. As the tank 100 fills, the level passes over a first pump on sensor 107 which signals the control unit 101 to switch on pump one 102. Pump one 102 then operates until the level drops to a pump one off sensor 110, which signals the control unit 101 to switch pump one 102 off. If pump one 102 does not switch off, then a low level alarm 111 is raised. In the event that the tank continues filling after pump one 102 is operating, then a Pump Two On sensor 112 is reached and the control unit 101 switches on Pump Two 103. If this then makes way against the rising level, then the level will drop to a Pump-Off sensor 113 which causes the control unit 101 to switch off Pump Two 103. In the event that the fill continues despite the operation of pumps one and two, a Pump Three On sensor 114 causes the control unit 101 to switch on Pump Three 104. Pump Three 104 is switched off concurrently with Pump Two 103 by virtue of the level dropping below the pump off sensor 113. Should the level continue to fill despite three pumps operating, them a high level sensor 115 will cause the control unit 101 to raise high level alarm 116.

In the event that the control unit 101 registers an anomaly between the level readings of any of the sensors, then reference may be made to signals from the pressure transducer 50 where the notional level is reasonably above the Pump One On sensor 110 and a pump switching decision may be made by the control unit 101. Where the anomaly is indicative of a fat build-up or other occlusion of the sensor, the control unit 101 operates the piezo vibrator 49 as per the previously described embodiment to clear the build-up.

By combining the probe and sensor in the same profile, the problems of the probe alone and the use of separate sensing parts is eliminated. The weight length and narrow profile of the probe makes it the most reliable and accurate sensing device without any of the problems associated with other prior art sensing devices. Sewerage wells should be pumped out completely otherwise excessive fat build-up occurs. The probes low-level cutout is very reliable so arbitration on what method is easily worked out by the controller due to precise and fixed distances the transducer will be in relation to the bottom sensor every time on every model probe. With a precise physical relationship between a probe sensors and analogue devices that does not vary, decisions are easily made by the controller. Fat build-up can be calculated by comparing the pressure sensor and probe through this duty area on the probe. The combination sensors are more effective through the mid range of the pump out cycle and comparative data will indicate the necessity to clean the probe and in the meantime, use the transducer readings for pump control. Inversely, fat build-up occasionally is insulative which delays activation. This will also be picked up by a pressure transducer at a fixed distance.

Because high level alarms are rare, probe sensors and connections are not confirmed regularly. This area is critical from an EPA perspective. Should the continued 5 calibration from all sensors immediately below indicate normal operation, the first method to indicate a high level will be taken and used. If however, the transducer has proven to be unreliable on the previous sensors, a high level reading on the transducer will be ignored until confirmed by the probe sensor. Multiple probe sensors can be connected as backup for this critical area as well. By having a transducer in parallel, the transducer 10 output reliability can be confirmed by the last sensor and then used more confidently above the probe to monitor levels in this range. In addition, the dual redundant cable connection to the top sensor which can be monitored by the controller for breakage will provide a more reliable high level alarm notification.

Figure 8:
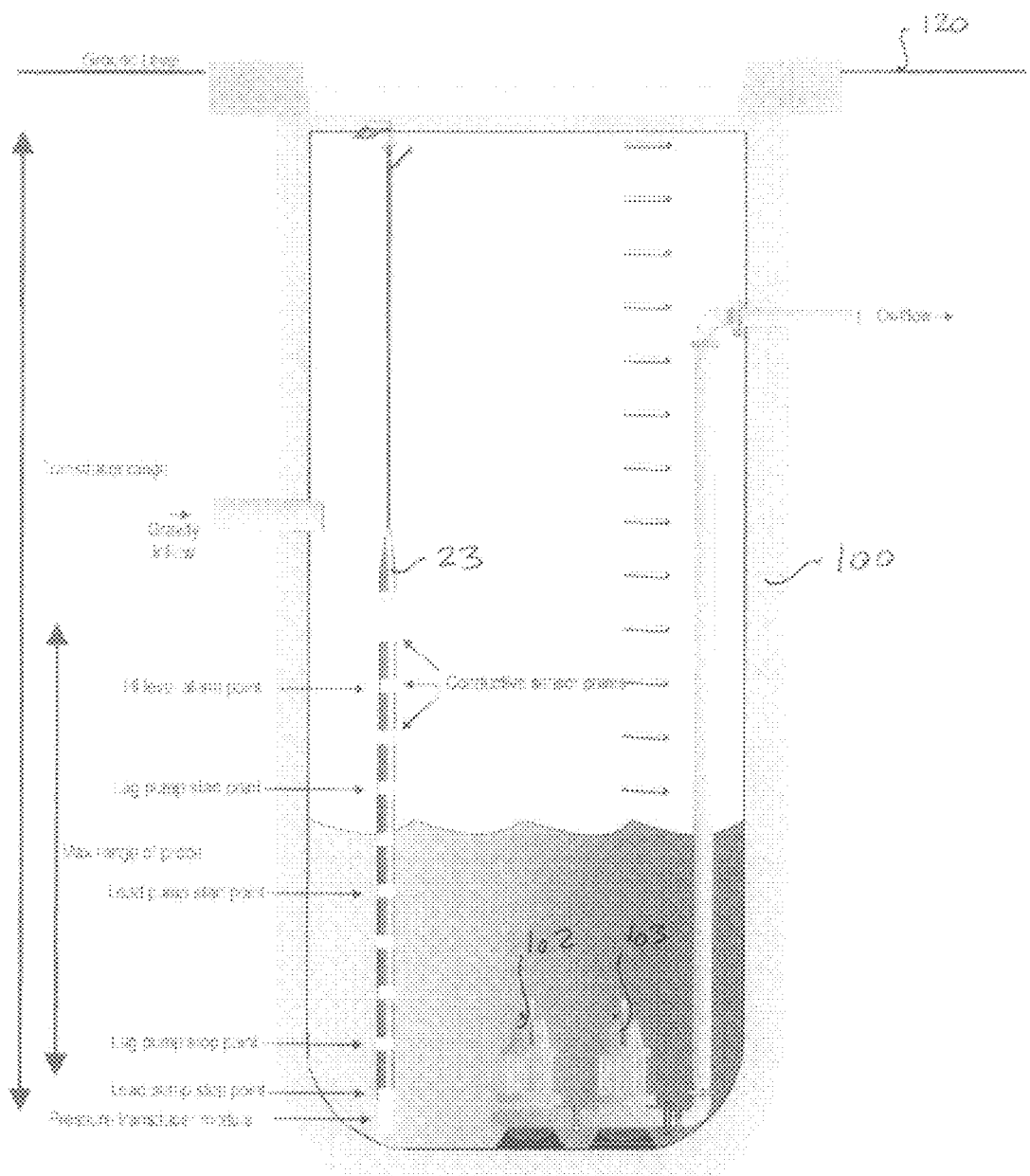
FIG. 8 illustrates the pumping station of FIG. 7 with a sewage tank embedded in the ground.

The pumping station system of FIG. 7 may be fitted so that the sewage tank 100 to be emptied is embedded in the ground 120 as shown in FIG. 8.

Figure 9:
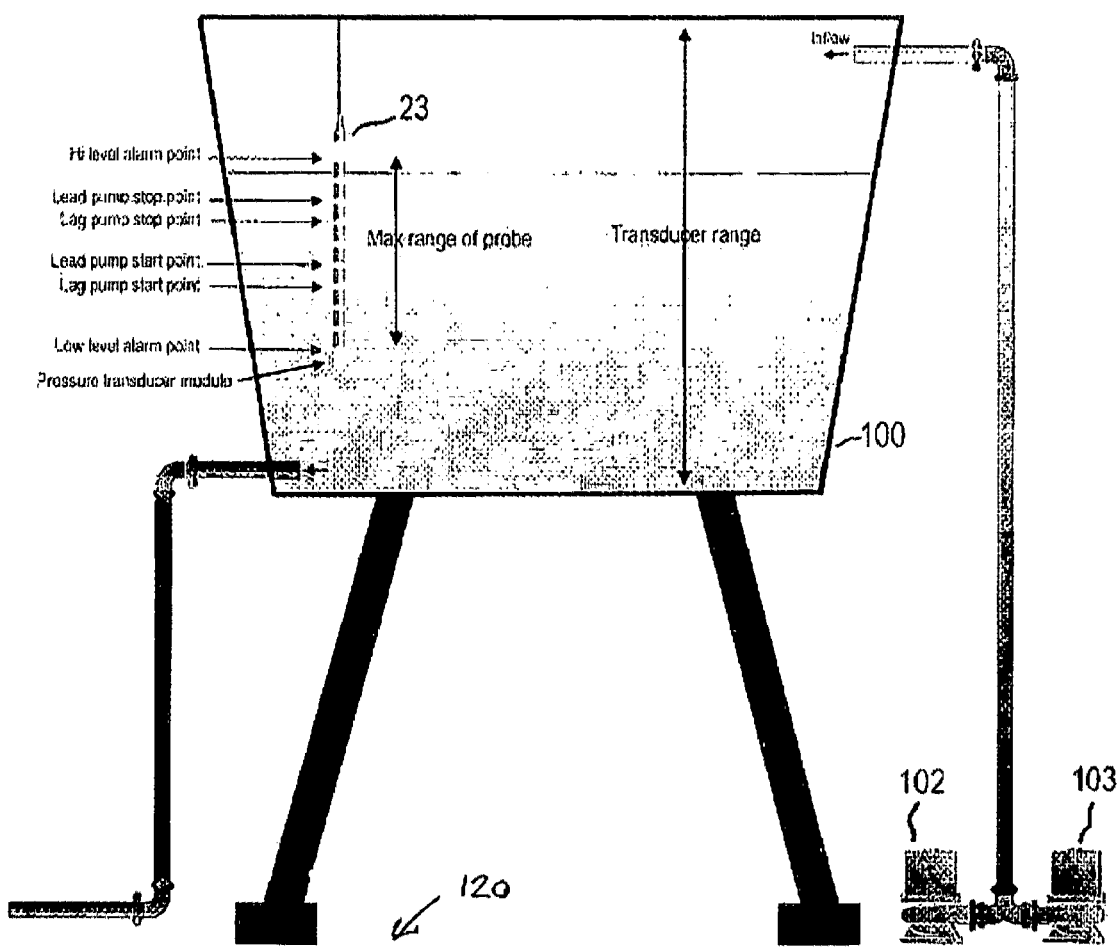
FIG. 9 illustrates a pumping station with a water tank suspended above the ground in accordance with an embodiment.

Alternatively, the probe 23 can be used in the pumping station system shown in FIG. 9 whereby the water tank 100 to be filled is suspended above the ground 120.

A further embodiment of the present invention is shown in FIGS. 10 to 13. Any like reference numerals in these figures relate to like features previously described.

Figure 10:
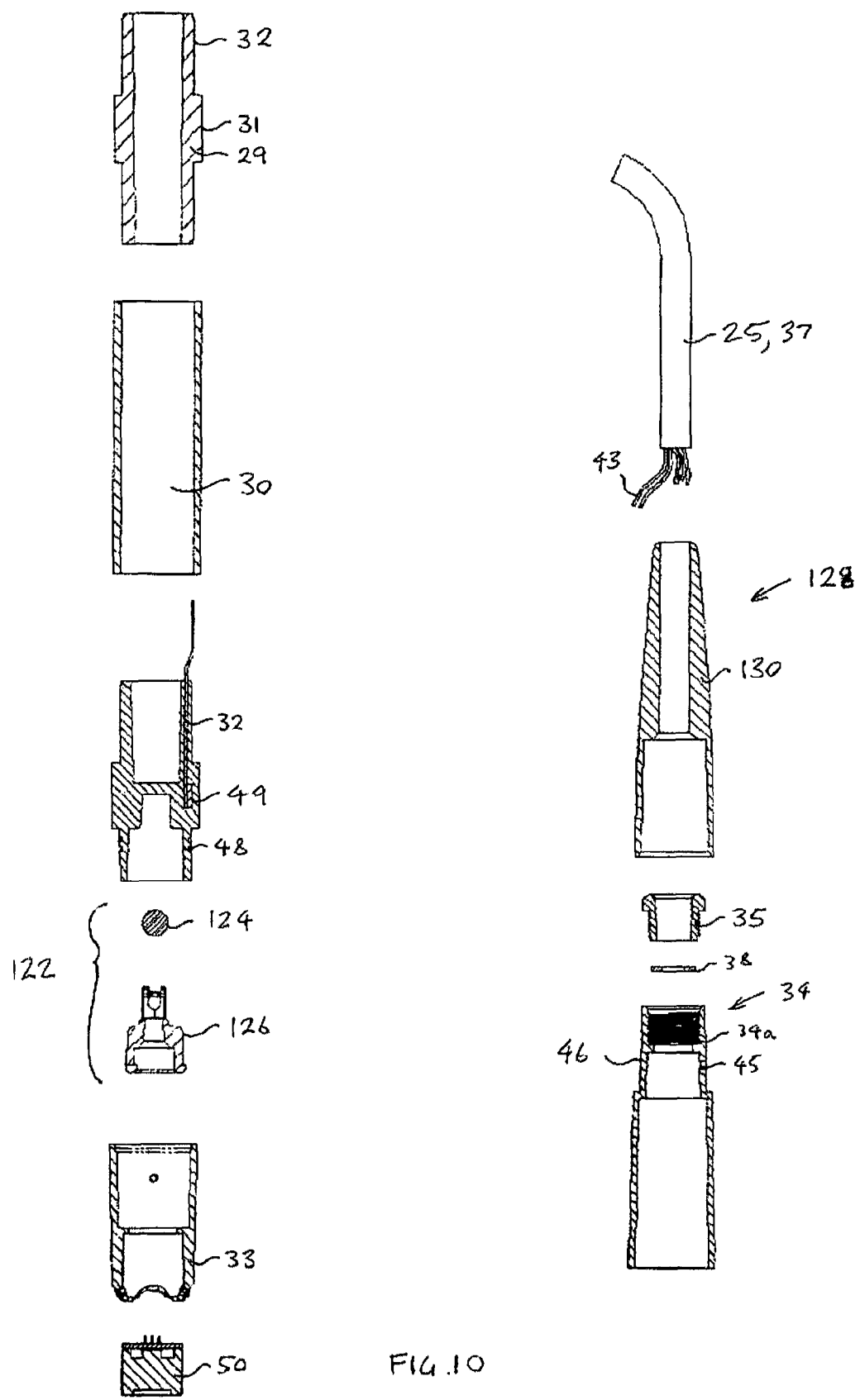
FIG. 10 is an exploded view of another monitoring assembly in accordance with an embodiment of the present invention.

Turning to FIG. 10, the modular monitoring assembly includes a plurality of tubular module components which can be interconnected to form the elongate body of the liquid sensory probe 23. During manufacture, the modules may be sealed together using adhesive resin. The tail (or bottom) portion of the probe 23 can include a ball valve assembly 122 for impeding the downward flow of adhesive resin from the head (or top) of the probe 23 to the bottom cap 33. The ball valve assembly 122 includes a ball 124 and a retainer 126 in which the ball 124 is retained. The pressure transducer 50 is releasably engaged within the bottom cap 33.

Figure 13:
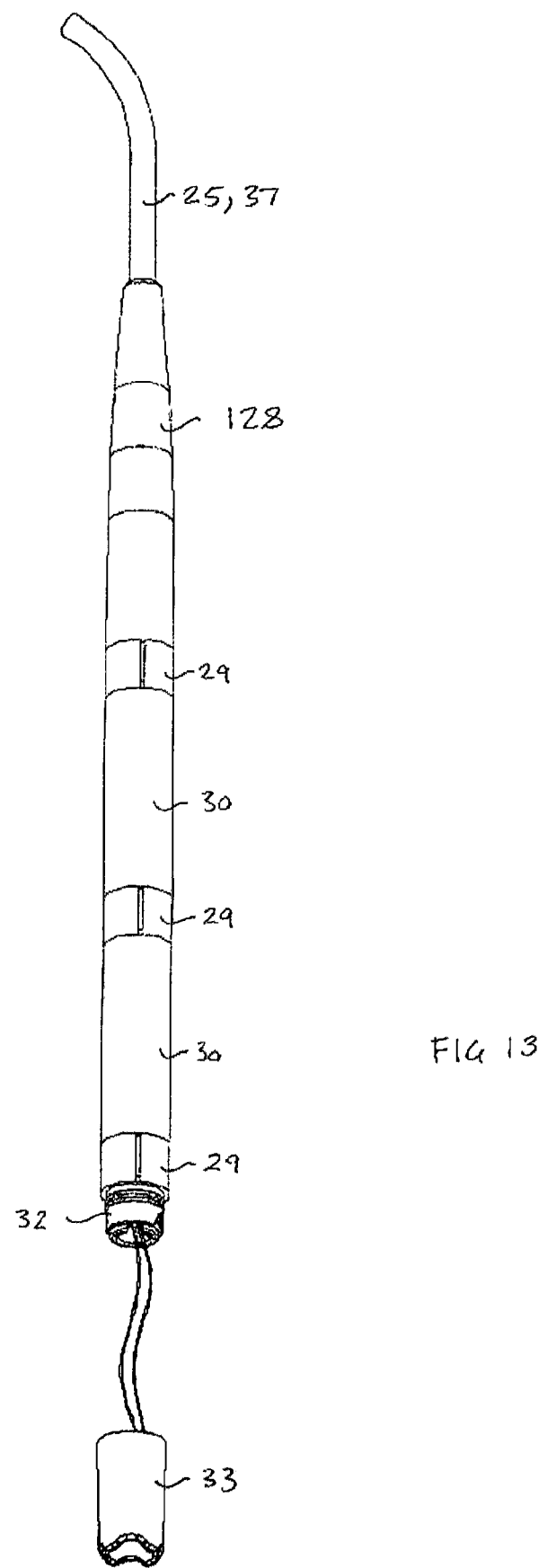
FIG. 13 illustrates an assembled monitoring apparatus of FIG. 10.

The head of the probe 23 includes a hollow cover 128 having a frusto-conical portion 130. The cover 128 is shaped to impede rags and other debris from collecting about the head of the probe 23. The base of the cover 128 is shaped to receive the body portion 34a and the threaded nut 35. The cover 128 also receives the cable sheath 37 with a liquid tight seal being formed there-between (FIG. 13).

Turning to FIG. 11, an end of the sensing section 29 may define a pair of opposed slots 132 which form part of a bayonet fastener. Accordingly, adjacent modules 30, 33 may define a pair of complementary posts for engaging with the opposed slots 132 during fastening of the bayonet fastener.

Figure 14:
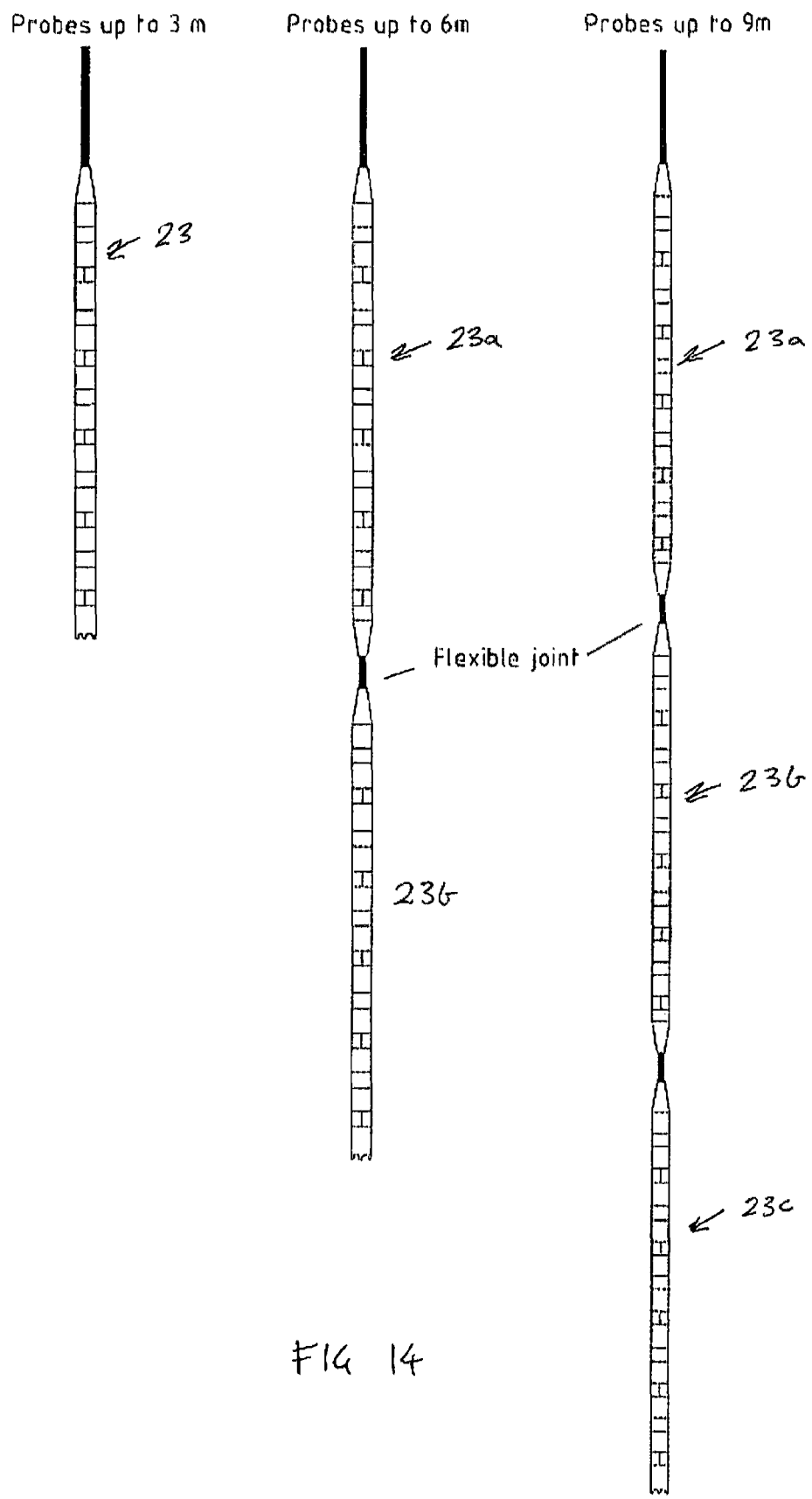
FIG. 14 illustrates the serial interconnection of monitoring apparatuses.

As shown in FIG. 14, a plurality of probes 23 can be interconnected in series to form a sensor of increased length. A flexible joint is provided between each adjacent pair of probes 23.

Figure 15:
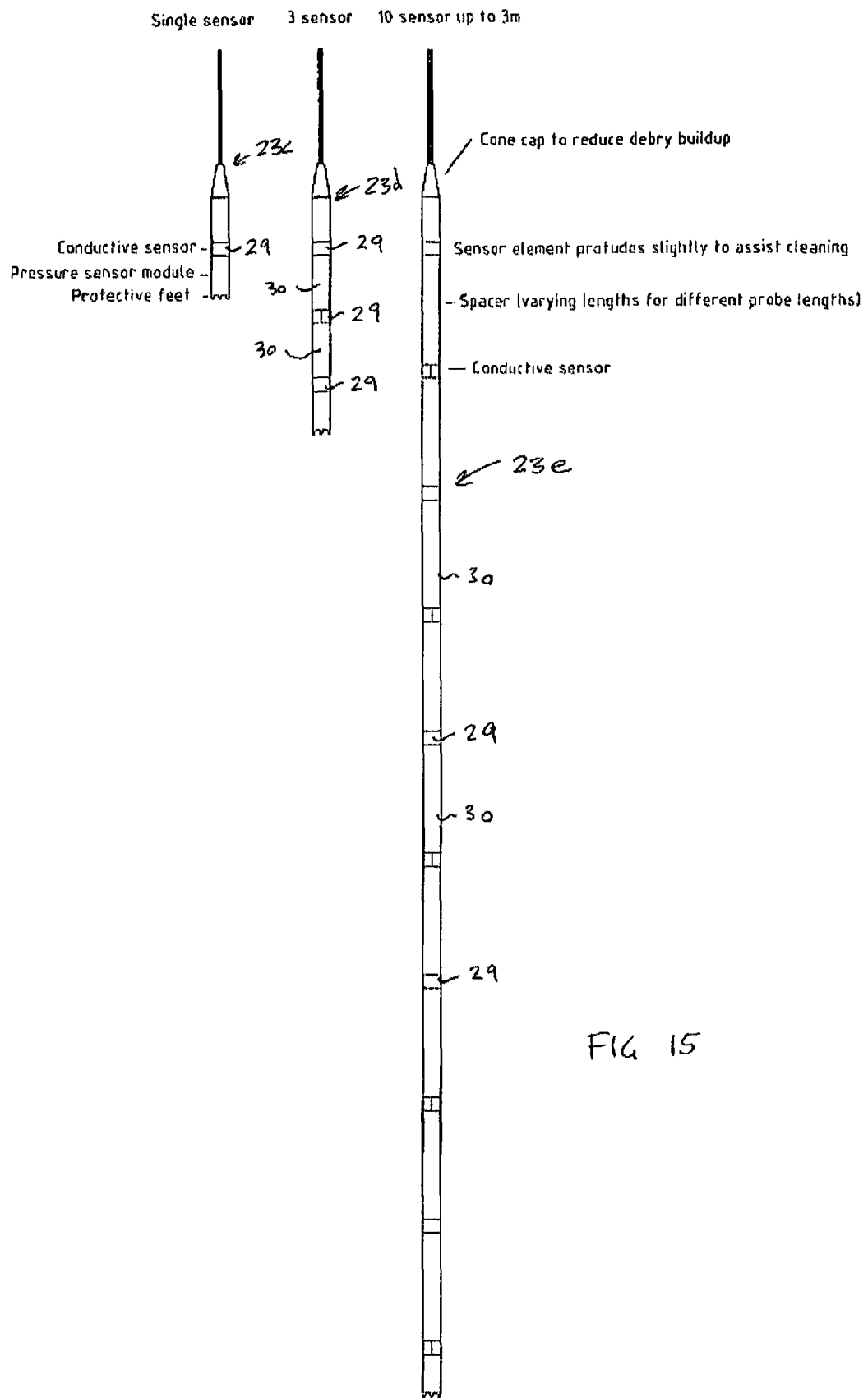
FIG. 15 illustrates monitoring apparatuses having different numbers of sensing stations.

Referring to FIG. 15, the probes 23 may have one or more sensing stations 29, depending upon the required sensing resolution and range of depth of the liquid level to be sensed.

The sensing resolution can be increased by reducing the spacing (and spacer length) between adjacent sensing stations 29. The range of depth of the liquid level to be sensed can be increased by increasing the number of sensing stations 29. Each probe 23 may have protective feet for protecting the base of the probe (and the encapsulated pressure transducer 50) against knocks to the tail of the probe 23. Each sensing station 29 may protrude from each adjacent pair of spacers 30 to facilitate cleaning.

It will of course be realised that while the above has been given by way of illustrative example of this invention, all such and other modifications and variations thereto as would be apparent to persons skilled in the art are deemed to fall within the broad scope and ambit of this invention as is set forth in the following claims.

The invention claimed is:

1. A wastewater sensor to be located in wastewater, the wastewater sensor including:
    an elongate body defining a head and a tail;
    a level sensor including one or more sensing stations supported by the body between the head and the tail and for sensing the wastewater level, each sensing station including one or more electrodes for contacting the wastewater and through which electricity can enter or leave the wastewater; and
    a depth sensor fixedly supported by the body to sense the depth of the tail in the wastewater wherein the depth sensor includes a pressure sensor wherein the pressure sensor is releasably engaged within a bottom cap located at the tail, the bottom cap able to be separated from the rest of the body whilst bearing the pressure sensor.

2. The wastewater sensor as claimed in claim 1, further including another pressure sensing device for sensing a pressure in a gas space supplied with gas within the elongate body.

3. The wastewater sensor as claimed in claim 2, wherein the gas space is maintained substantially isobaric with hydrostatic pressure at the tail of the elongate body.

4. The wastewater sensor as claimed in claim 1, wherein said sensing stations include at least three sensing stations that are linearly spaced apart, and the wastewater sensor is pre-calibrated and can be moved without the need to recalibrate the sensors.

5. The wastewater sensor as claimed in claim 4, wherein the sensing stations are regularly spaced apart by a common separation distance.

6. The wastewater sensor as claimed in claim 4, wherein the sensing stations are each elongate and are arranged coaxially and in alignment with the body.

7. The wastewater sensor as claimed in claim 4, wherein each sensing station includes a pair of opposed electrodes which are exposed so as to each contact the wastewater for redundancy purposes owing to an accumulation of fat from the wastewater.

8. The wastewater sensor as claimed in claim 7, wherein each electrode of the pair is interconnected by a conductive bridge so that the electrodes are at a common potential.

9. The wastewater sensor as claimed in claim 7, wherein each electrode is a protrusion extending from the body to contact the wastewater.

10. The wastewater sensor as claimed in claim 1, wherein each sensing station includes a pair of conductors for individually and directly coupling to a control means.

11. The liquid sensor as claimed in claim 1, further including a pair of multicore cables wherein damage to one of the cables can be detected by reference to the other cable.

12. The wastewater sensor as claimed in claim 11, wherein the multicore cables each include an insulation sheath and each carry like signals for redundancy purposes.

13. The wastewater sensor as claimed in claim 1, further including a vibrator for vibrating deposited residue free from the wastewater sensor.

14. The wastewater sensor as claimed in claim 13, wherein the vibrator includes a piezo or electromechanical vibrator means.

15. The wastewater sensor as claimed in claim 1, wherein the wastewater sensor includes an elongate and hollow body which defines the head and tail.

16. The wastewater sensor as claimed in claim 1, wherein each sensing station includes a binary sensor which indicates a first state when submerged in the wastewater and a second state when not submerged in the wastewater, the binary sensors being electrically isolated from each other.

17. A wastewater level monitor to be located in a wastewater well, the wastewater monitor including:
    an elongate body defining a head and a tail;
    a level sensor including one or more sensing stations supported by the body between the head and the tail and for sensing the wastewater level, each sensing station including one or more electrodes for contacting the wastewater and through which electricity can enter or leave the wastewater;
    a depth sensor fixedly supported by the body to sense the depth of the tail in the wastewater wherein the depth sensor includes a pressure sensor wherein the pressure sensor is releasably engaged within a bottom cap located at the tail, the bottom cap able to be separated from the rest of the body whilst bearing the pressure sensor; and
    a controller electrically coupled to both the level sensor and depth sensor so that readings of the sensors can be cross-checked for integrity.

18. The wastewater level monitor as claimed in claim 17, wherein the controller can provide for diagnostic outputs determined by monitoring the relative conditions of the sensors.

19. The wastewater level monitor as claimed in claim 17, wherein the controller is configured to detect the necessity to clean the wastewater sensor using comparative data when fat from the wastewater builds up on the wastewater sensor.

* * * * *

UNITED STATES PATENT AND TRADEMARK OFFICE
CERTIFICATE OF CORRECTION

PATENT NO. : 8,297,119 B2
APPLICATION NO. : 11/922184
DATED : October 30, 2012
INVENTOR(S) : Craig Stevenson Parkinson Page 1 of 1

It is certified that error appears in the above-identified patent and that said Letters Patent is hereby corrected as shown below:

In the Claims:

Column 12, line 7, claim 11, cancel the text "The liquid sensor" and insert the text:

--The wastewater sensor--

Signed and Sealed this
Twenty-third Day of April, 2013

Teresa Stanek Rea
*Acting Director of the United States Patent and Trademark Office*